UNITED STATES PATENT OFFICE.

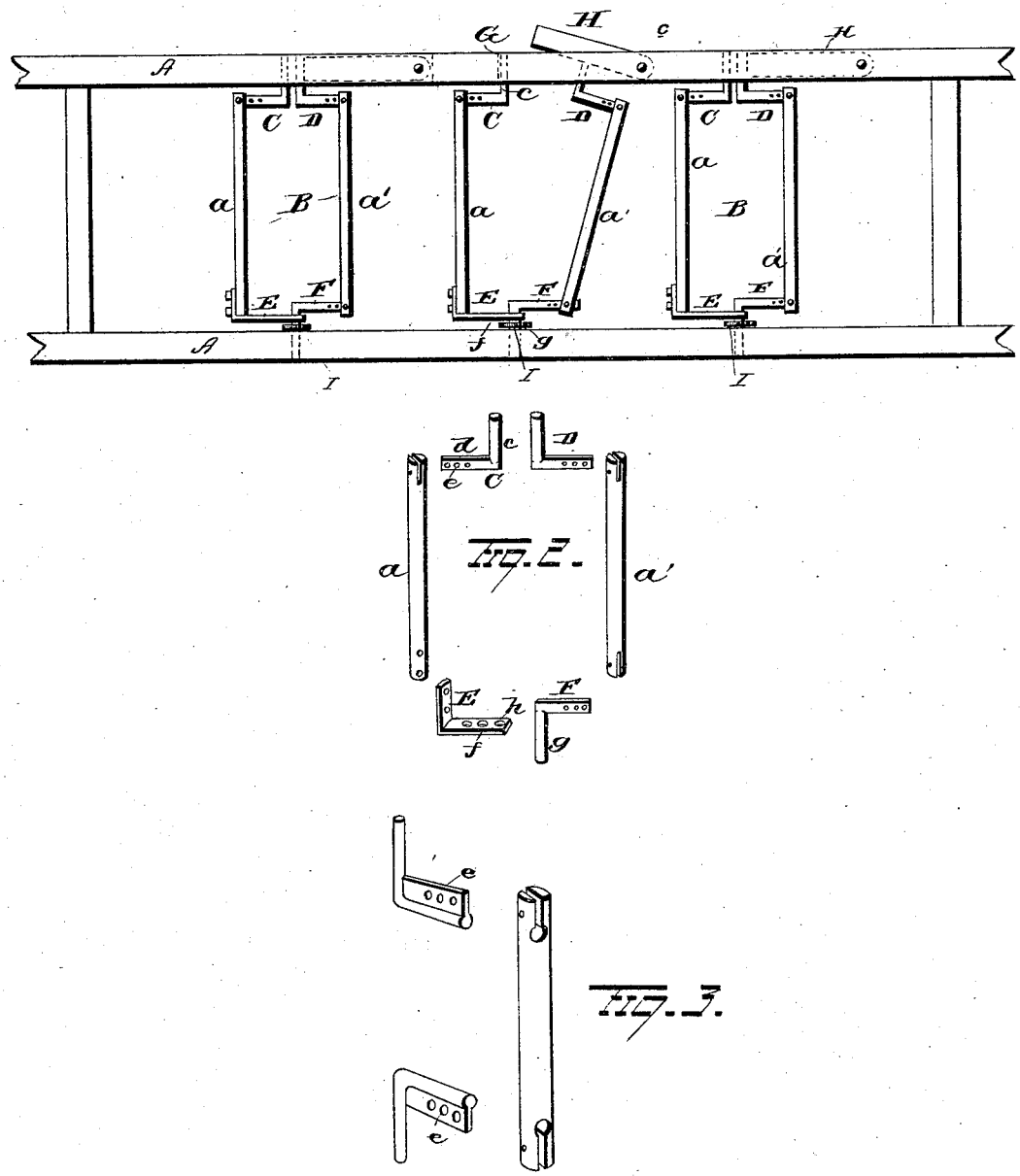

MYRON G. WOOD, OF CHURCH'S CORNERS, ASSIGNOR OF ONE-HALF TO EMERY VAN PATIN, OF WHEATLAND, MICHIGAN.

CATTLE-STANCHION.

SPECIFICATION forming part of Letters Patent No. 290,620, dated December 18, 1883.

Application filed May 16, 1883. (No model.)

*To all whom it may concern:*

Be it known that I, MYRON G. WOOD, of Church's Corners, in the county of Hillsdale and State of Michigan, have invented certain new and useful Improvements in Cattle-Stanchions; and I do hereby declare the following to be a full, clear, and exact description of the invention, such as will enable others skilled in the art to which it pertains to make and use the same.

My invention relates to an improvement in cattle-stanchions, the object of the same being to provide an adjustable device adapted for cattle of different sizes, and so secured in position as to accommodate itself to the movements of the animal; and it consists in the parts and combinations of parts, as will be more fully described, and pointed out in the claims.

In the accompanying drawings, Figure 1 shows my improvement in front elevation, one of the stanchions being in a closed and locked position and the other in open adjustment. Fig. 2 shows the parts detached, and Fig. 3 shows a modified form.

A represents the stanchion-supports, between which any suitable number of stanchions can be secured. These stanchions B are each composed of the two neck-bars $a$ $a'$, preferably made of metal and cylindrical in shape, so as to present no angular surface that would tend to cut or bruise the animal, and are adjustably secured together by the angle-irons C, E, D, and F, which enable the size of the stanchions to be increased or diminished to suit the cattle. The angle-iron C shown in Fig. 2 is provided with a rounded vertical portion, $c$, and a horizontal portion, $d$, the latter being provided with a series of holes, $e$, so as to enable the neck-bar $a$ to be adjustably secured thereto in a rigid manner. The iron E is rigidly secured by its vertical arm to the neck-bar $a$ in any suitable manner, while the horizontal arm $f$ thereof is provided with a series of holes, $h$, to enable the lower end of the neck-bar $a$ to be adjusted inward or outward, as necessity demands. The spindle $g$ of the iron F is adapted to pass through either of the holes $h$, for the twofold purpose of holding the parts together and forming a loose joint or connection, whereby either bar $a$ or $a'$ can turn independently of the other. The lower end of the neck-bar $a'$ is pivotally secured in an adjustable manner to the horizontal arm of the iron F, while the upper end thereof is rigidly secured in an adjustable manner to the horizontal arm of the iron D, thereby enabling the stanchion to be opened and closed without removing either neck-bar. The upper stanchion-support A is provided with a vertical opening sufficiently large to admit of the free movement of the two spindles $c$ of the irons C and D without binding, and long enough to enable the pivoted arm $a'$ to swing backward to an open position, as shown in Fig. 1; or, instead of providing the cross-bar with the slots, as described, two boards can be joined parallel and provided with stops G, which limit the movement of the spindles $c$ in one direction, while the pivoted latch H, which is also secured between the boards, limits the movement in the other direction. When it is desired to open the stanchion for the purpose of securing or releasing an animal, the latch H is thrown upward, which allows the neck-bar $a'$ to swing away from the bar $a$. The spindle $g$ of the iron F passes through one of the holes $h$ of the iron E and rests in a suitable socket formed in the lower cross-bar A, a washer, I, however, being interposed between the arm $f$ and the cross-bar, for the purpose of preventing the iron E from engaging the sill or lower stanchion-support. This spindle forms the axis for both arms, and enables them to be turned in the same or different directions. Thus it will be seen that if the animal presses against the neck-bars $a$ $a'$ they move away in the arcs of circles, and if a pulling force is exerted on them they move toward the animal in the same manner. By simply removing the bolts that secure the neck-bars to the irons and moving the said bars toward or away from each other, as the case may be, and again securing them in position, the size of the stanchion can be increased or diminished to suit cattle of different sizes. By this construction of parts the cattle are allowed considerable freedom, and are at liberty to turn their heads in any direction without danger of being strangled.

My invention is simple in construction, is durable and effective in use, and can be manufactured at a small initial cost.

Instead of making the angle-irons as shown in Figs. 1 and 2, they can be constructed as shown in Fig. 3. In this form both arms of the irons are round, and the horizontal arms are provided with inwardly-extending webs or flanges e, which prevent the bars from turning thereon. This construction could be employed on all but the iron F, and this could be left as previously described, to enable the bar a' to be tilted. Again, instead of passing the vertical arm of the iron through the horizontal arm of the iron E, as shown, both irons can be provided with vertical arms, as shown in Fig. 3.

It is evident that slight changes in the construction and relative arrangement of the several parts might be resorted to without departing from the spirit of my invention, and hence I would have it understood that I do not limit myself to the exact construction of parts shown and described, but consider myself at liberty to make such changes and alterations as fairly fall within the spirit and scope of my invention.

Having fully described my invention, what I claim as new, and desire to secure by Letters Patent, is—

1. The combination, with suitable stanchion-supports, of a stanchion consisting of two pivoted sections, one section being constructed to be opened and closed, and the side bars of the stanchion-sections made adjustable, substantially as set forth.

2. The combination, with suitable stanchion-supports, of a movable stanchion composed of two neck-bars and intermediate connections, one of the said neck-bars being pivoted at its lower end, and a latch connected to the upper stanchion-support for the purpose of securing the two neck-bars together.

3. The combination, with the stanchion-supports, of the angle-irons and the neck-bars adjustably secured thereto, all of the above parts being combined and adapted to operate as described.

4. The combination, with the stanchion-supports and the latch, of the angle-irons, each having a series of holes formed therein, and the neck-bars adjustably secured to the irons, all of the above parts being constructed, combined, and adapted to operate as described.

5. The combination, with the side arm, a, and the iron E, having a series of holes formed therein, of the bar a', the iron F, and the spindle g, which latter passes through the horizontal portion of the said iron E and rests in a socket formed in the lower stanchion-support.

In testimony whereof I have signed this specification in the presence of two subscribing witnesses.

MYRON G. WOOD.

Witnesses:
THOMAS J. HILLER,
T. W. TOLCHARD.